E. D. ARTHUR AND W. G. CARTTER.
SOLAR HEATER.
APPLICATION FILED FEB. 10, 1919.

1,338,644.

Patented Apr. 27, 1920.

Witness
W. M. Gentle

Inventors.
Edward D Arthur
William G. Cartter.
by
James R. Townsend.
Atty.

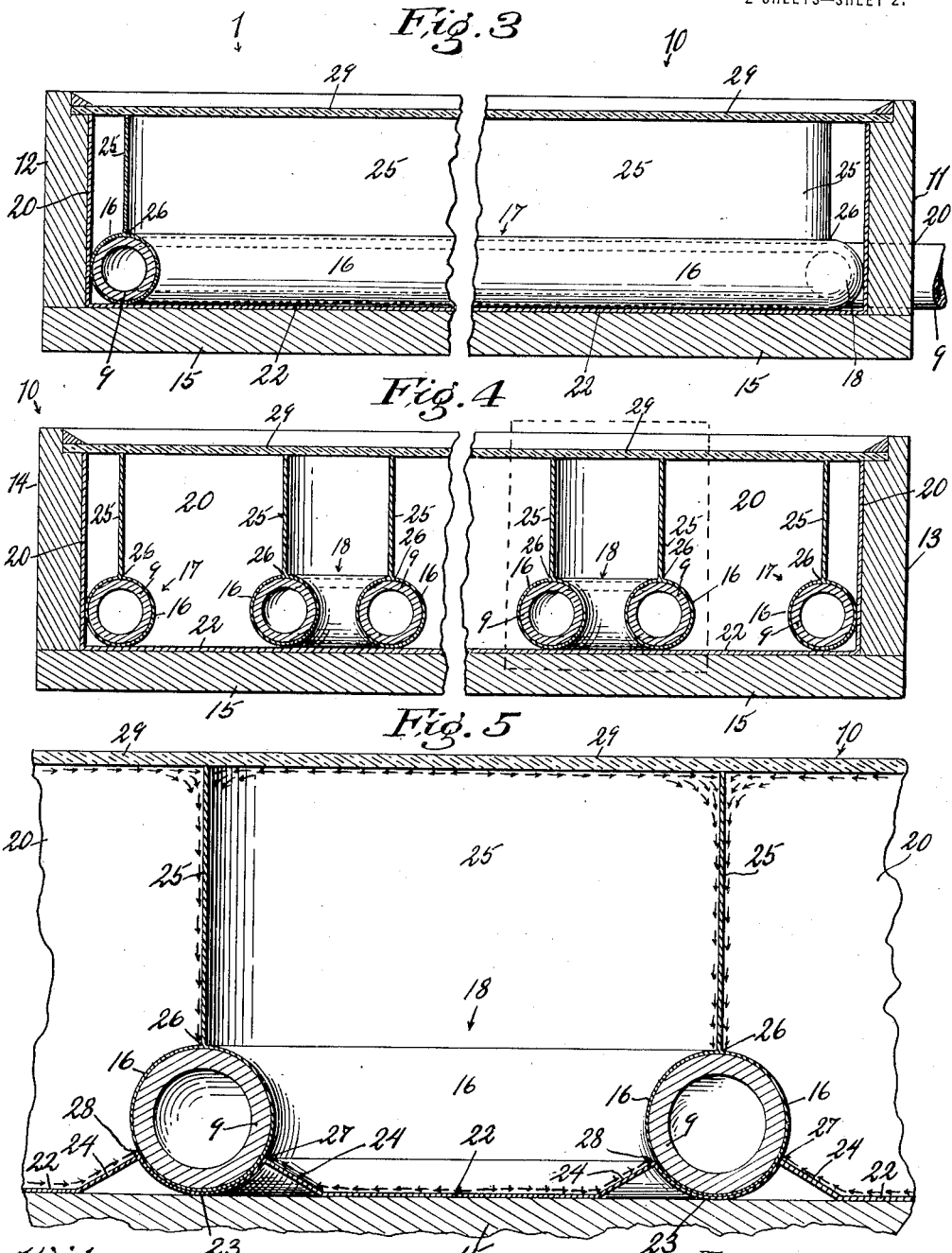

UNITED STATES PATENT OFFICE.

EDWARD D. ARTHUR AND WILLIAM G. CARTTER, OF ARCADIA, CALIFORNIA.

SOLAR HEATER.

1,338,644.  Specification of Letters Patent.  Patented Apr. 27, 1920.

Application filed February 10, 1919. Serial No. 276,207.

*To all whom it may concern:*

Be it known that we, EDWARD D. ARTHUR and WILLIAM G. CARTTER, citizens of the United States, residing at Arcadia, in the county of Los Angeles and State of California, have invented new and useful Improvements in Solar Heaters, of which the following is a specification.

This invention relates to solar heaters, and consists in the novel and useful features and improved construction arrangement and combination of parts, the purpose of which will be apparent to those skilled in the art from a consideration of the preferred form of structure herein shown, described and claimed.

The principal object of this invention is to provide a means for more effectively utilizing solar heat to raise the temperature of the water of an ordinary dwelling house water system to a sufficient degree for domestic purposes. Our solar heater is connected directly to the usual water system piping of a dwelling and practically becomes an element in that system.

Another object of the invention is to provide a solar heater with a water pipe that is not only best adapted to absorb the solar heat, but which is also free from internal corrosion such as would leave a mineral taint in the water; that is to say, any pipe may be used that is best adapted to convey the water without injury to its purity.

Another feature of the invention is to provide a pipe construction that will best resist freezing and the effects of frozen pipes; as the solar heater will be in an exposed position where it will be subjected to a low or freezing temperature during the winter season. The pipe is constructed with a heavy wall which in cross section would be of considerable thickness and sufficient to withstand any ordinary internal strain incident to internal pressure.

Another object is to provide a jacketed surface to the water pipe of the solar heater, which, in addition to reinforcing the pipe, adds thereto the feature of increased heat conduction; being preferably of copper, the best heat conducting material.

Another object is to provide a means for utilizing both the conduction and radiation of heat to the pipe through the solar heater.

Another feature of the invention is the connection of the solar heater with a house water system in which a gas or furnace heater is connected, either of which heaters may be used, or both, to raise the water temperature.

Further objects, advantages and features of novelty and invention may appear from the accompanying drawings, the subjoined detail description and the appended claims.

The invention is illustrated by the drawings, in which,

Fig. 3 is an enlarged section through the solar heater taken on the line $x^3$—$x^3$, Fig. 2, the center portion being broken away.

Fig. 4 is an enlarged section through the solar heater taken on the line $x^4$—$x^4$ of Fig. 2, the center portion thereof being broken away.

Fig. 5 is a fragmentary view of a part of Fig. 4 enlarged to full size; and a modification shown of the base plate. The part taken from Fig. 4 is indicated by the rectangular dotted line inclosure.

Figure 1:
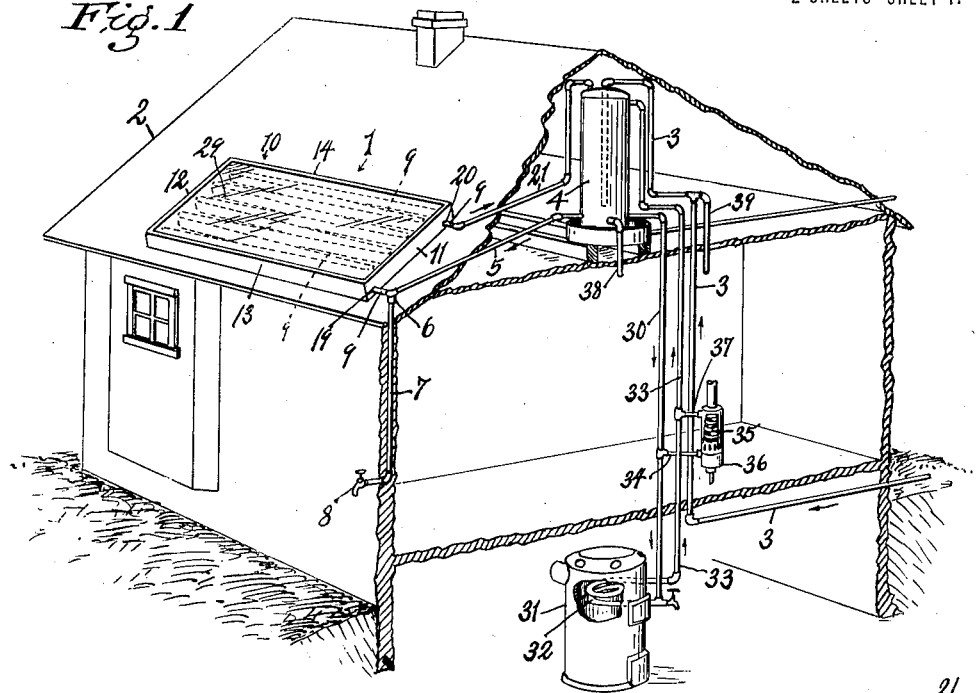
Figure 1 is a perspective view of the solar heater installed in a dwelling the end of which is broken away to show the connection of the solar heater with the water system and the other heaters.

In detail, the solar heater 1 is installed on the roof of a house 2, and secured in place by any well known means, and in such a position that during the day it will be exposed to the sun, and so positioned that the sun's rays will contact with the glass covering of the heater in a line perpendicular to the plane of the glass.

A water pipe 3 leads from some water supply, not shown, into the house and discharges into the tank 4, which may be of any size and located in the upper part of the house so that the water in it may be of a higher elevation than the water in the solar heater.

From the bottom of the tank 4 a pipe 5 leads to one opening in the T joint 6, and from another of such openings in the T 6 a pipe 7 leads downward to the discharge cock 8.

From the remaining opening in the T 6 a pipe 9 leads through the wall of the solar heater 1, near the bottom and right hand corner thereof. The portion of the pipe 9 within the solar heater frame 10 formed of the ends 11 and 12 and the side plates 13 and 14, and bottom plank 15, is incased in a copper jacket 16.

Figure 2:
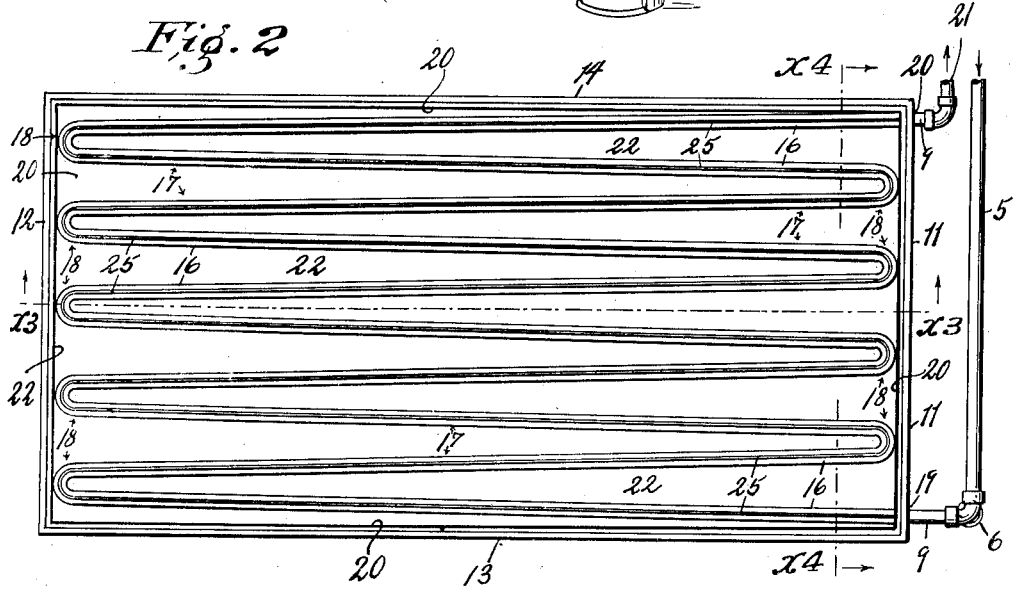
Fig. 2 is a plan view of the solar heater with the glass cover removed for the purpose of showing the pipe and its associated parts.

As seen in Fig. 2 the copper jacketed portion of the pipe 9 which is within the solar heater frame 10 is bent to form a plurality of lengths 17 that are integral with the turned ends 18. As seen in Fig. 2, each of the lengths 17 is inclined upward from its intake to its discharge end so there will be a continual rise in the flow of the water as it travels through the heating coil from the inlet point 19 to the discharge point 20. These copper jacketed lengths 17 and turns 18 form the heating coil.

A pipe 21 connects the upper or discharge end of the coiled pipe 9 with the tank 4 so that the water in the tank can pass to the solar heater 1 and return to the tank when the water is heated; and this flow is induced as soon as the temperature of the water in the solar heater rises above that in the tank.

As shown in Figs. 3, 4 and 5 additional means are supplied for raising the temperature of the heating coil 9 and consequently raising the temperature of the water flowing therethrough.

The frame 10 has its interior surface lined with the sheet copper 20, and the copper jacketed coil 9 lies directly upon the bottom portion of the copper 22, and may be soldered thereto in order to form a close contact between the bottom sheet copper 22 and the pipe casing copper 16. As seen in Fig. 5, the contacting surface between the sheet copper 22 and the copper jacket 16 can be enlarged by having the sheet copper bottom 22 stamped into a channel 23, substantially the same length, contour and radial curvature as the exterior surface of the copper jacket 16, forming thereby a bed in which the coil 9 can lay.

Preferably the channel 23 would be of a depth sufficient to produce a contacting surface to engage about one third of the bottom circumference of the jacket 16 when viewed in cross section as seen in Fig. 5. With such contacting surface in the channel 23 the bottom copper plate 22 would have the inclined walls 24 connecting it with the top edges of the channel 23.

A copper ribbon 25, whose lower edge is integral with or is soldered to the jacket 16 the entire length of the coil, at a point 26 in a line perpendicular with a longitudinal line through the center of the coil 9, and which is about one third of the circumferential distance from the points 27 and 28, has its upper edge in contact with the glass cover 29 of the case. This glass cover is secured to the frame 10 by any well known means. The ribbon 25 also provides an additional supporting means for said cover 29 whereby a single pane of glass can be used if desired thereby eliminating the cooling effects of shadows on the coil 9.

In this solar heater shadows will be practically eliminated as the apparatus is positioned so that the sun's rays will enter the solar heater in lines parallel to the sides of the ribbon 25.

In the preferred form of construction, as shown in Fig. 5 the inclined walls 24 will eliminate the shadows under the sides of the coil 9. With the cooling shadows effects eliminated from the solar heater, practically all of the heat entering therein will be conveyed to the coil 9 by radiation and conduction.

The travel of heat by conduction is shown in Fig. 5 by the short arrows paralleling the course of travel, both from the heated glass and the copper plated bottom of the solar heater, directly to the coil 9 which the heat enters at about equal distances around the circumference when viewed in cross section. A great deal of emphasis is placed upon the foregoing, for it is well known that the transmission of heat from one body to another is more effectively accomplished by conduction than by radiation. However, it is not to be understood from the foregoing that the radiated heat is not to be utilized, as a provision is made for conducting the heat thus formed to the coil 9. In other words, the heat rays passing through the glass 29 that do not contact directly with the coil 9 are collected in the copper bottom 22 and through it transferred to the coil 9 by conduction.

From the foregoing it will be readily seen that all the heat rays entering the solar heater will be utilized toward heating the coil 9 and consequently heating the water in the tank 4 sufficiently for domestic purposes.

If by reason of cloudy or cold weather the solar heater does not heat the water sufficiently, auxiliary means are provided to assist it. From the bottom of the tank 4 is a pipe 30 that extends down to the basement furnace 31 in which is located the coil 32 to which one end of the pipe 30 is connected; and the other end of the coil 32 is connected to a pipe 33 that leads back to the upper end of the tank 4, by means of which pipe connection to the furnace 31 the water in the tank 4 can be additionally heated.

Connected to pipe 30 is the branch pipe 34 that leads to one end of the coil pipe 35 shown in the gas heater 36; and the other end of the coil pipe 35 is connected by a pipe 37 to the pipe 33, so that by means of the gas heater 36 the temperature of the water in tank 4 can be additionally raised when the solar heater is semi-active and the furnace 31 not in use.

Extending from the bottom of the tank 4 is the hot water pipe 38 which is broken away the hot water system not being shown. Connected to the inlet pipe 3 is a cold water pipe 39 that is broken away, the distributing system not being shown.

In operation the water from some source of supply, not shown, passes through the pipe 3 to the tank 4, and from thence through the pipe 5 to the coil 9 of the solar heater 1, where the heat rays of the sun will by radiation and conduction be conveyed to the coil 9 and from thence into the water. The coil 9 is so positioned that there is less frictional engagement of the water with the interior wall of the pipe as the lighter heated water travels upward.

We claim:

1. In a solar heater, the combination with a glass covered heat radiating and conducting inclosure, of a coil pipe contained therein; and a conductor ribbon connecting said coil of pipe with the glass cover of said inclosure.

2. In a solar heater, the combination of a coil of copper jacketed pipe; a glass covered inclosure for said coil; and a copper conduction ribbon connecting the glass with said coil of copper jacketed pipe.

3. In a solar heater, the combination of a copper jacketed water pipe; a glass cover over said pipe; a copper conduction ribbon one edge of which contacts with the said copper jacket and the other edge with the glass; and copper conduction walls inclined toward and contacting with said copper jacket.

4. In a solar heater, the combination of a pipe; a copper covering for said pipe; a glass cover over said pipe; a metallic ribbon contacting with said glass and said pipe; said ribbon being positioned so that a line drawn through it from edge to edge and at right angles thereto will be perpendicular to a longitudinal line drawn through the center of said pipe.

5. In a solar heater, the combination of a pipe of relatively large cross section; a metallic bed in which said pipe is seated; and means for the conduction of heat to points on said pipe at equal distances around the circumference thereof.

6. A solar heater comprising a casing; a glass top on the casing; a continuous coil of pipe in said casing; a heat conducting jacket inclosing said pipe; a heat conducting connection between the jacket and the glass top of the casing; means for supplying water to said pipe; outlet means for said water; and auxiliary means for heating said water aside from the sun's rays.

7. In a solar heater, a glass covered casing; water pipes in said casing; and heat conducting means connecting the pipes with said glass.

8. In a solar heater, a glass covered casing; a continuous coil of water pipes in said casing; and continuous heat conducting means connecting the entire length of said pipes with the glass of the casing.

In testimony whereof we have hereunto set our hands at Los Angeles, California, this 28th day of January, 1919.

EDWARD D. ARTHUR.
WILLIAM G. CARTTER.

Witness:
    EDYTHEMAE BROWN.